United States Patent
Kanematsu et al.

(10) Patent No.: US 7,559,231 B2
(45) Date of Patent: Jul. 14, 2009

(54) LEAK INSPECTION DEVICE

(75) Inventors: Yoshikuni Kanematsu, Takahama (JP); Hiroshi Takenaka, Anjo (JP)

(73) Assignee: Denso Corporation, Kariya (JP)

(*) Notice: Subject to any disclaimer, the term of this patent is extended or adjusted under 35 U.S.C. 154(b) by 282 days.

(21) Appl. No.: 11/590,588

(22) Filed: Oct. 31, 2006

(65) Prior Publication Data

US 2007/0119237 A1    May 31, 2007

(30) Foreign Application Priority Data

Nov. 15, 2005    (JP)    ............................. 2005-330377

(51) Int. Cl.
    *G01M 3/04* (2006.01)
(52) U.S. Cl. ...................................... 73/40.7
(58) Field of Classification Search ................... 73/40.7
    See application file for complete search history.

(56) References Cited

U.S. PATENT DOCUMENTS

| 5,029,463 | A | * | 7/1991 | Schvester et al. | 73/40.7 |
| 5,317,900 | A | * | 6/1994 | Bergquist | 73/40.7 |
| 5,369,983 | A | * | 12/1994 | Grenfell | 73/40.7 |
| 5,375,456 | A | * | 12/1994 | Burns | 73/40.7 |
| 5,386,717 | A | * | 2/1995 | Toda | 73/40.7 |
| 5,767,391 | A | * | 6/1998 | Wong | 73/40.7 |
| 6,279,384 | B1 | * | 8/2001 | Heikkinen et al. | 73/40.7 |
| 6,729,177 | B2 | | 5/2004 | Shioya et al. | |
| 7,290,439 | B2 | * | 11/2007 | Perkins et al. | 73/40.7 |
| 7,320,243 | B2 | * | 1/2008 | Perkins et al. | 73/40.7 |
| 2007/0000310 | A1 | * | 1/2007 | Yamartino et al. | 73/40.7 |
| 2007/0018646 | A1 | * | 1/2007 | Hoath | 324/307 |

FOREIGN PATENT DOCUMENTS

| JP | 2003-240670 | 8/2003 |
| JP | 2005-114611 | 4/2005 |
| JP | 2005-121481 | 5/2005 |

* cited by examiner

*Primary Examiner*—Rodney T. Frank
(74) *Attorney, Agent, or Firm*—Harness, Dickey & Pierce, PLC

(57) ABSTRACT

In an inspection device in which a leakage of He gas from a product 1 is detected when He gas is pressurized and charged into the product 1 accommodated in a vacuum chamber 2, a variable displacement means, capable of changing the volume of the vacuum chamber corresponding to a size of the product 1, is provided in the vacuum chamber. An example of the variable displacement means is a variable displacement piston 8 which is arranged in the vacuum chamber and moves along wall faces of the vacuum chamber. A plurality of variable displacement pistons may be provided.

7 Claims, 6 Drawing Sheets

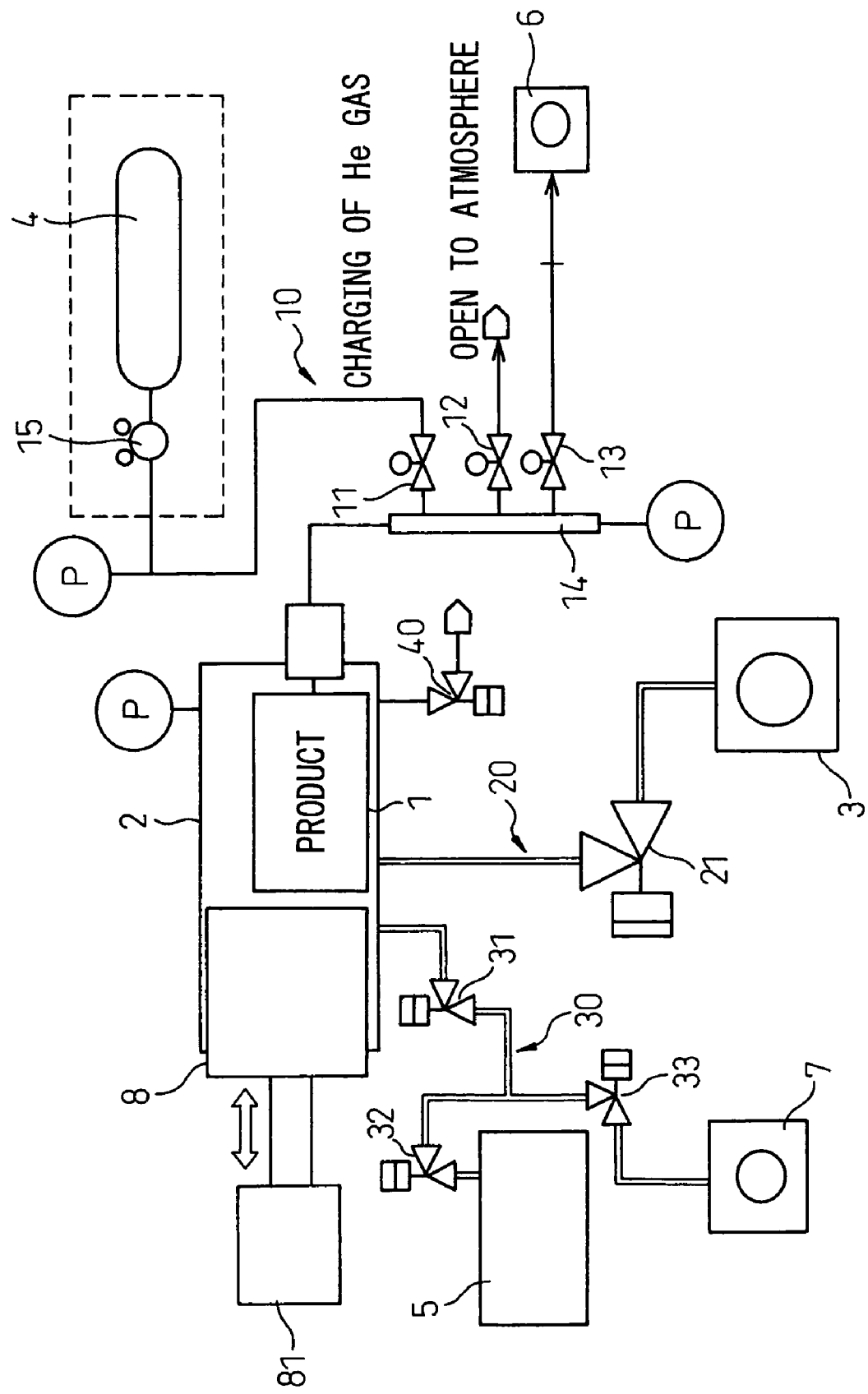

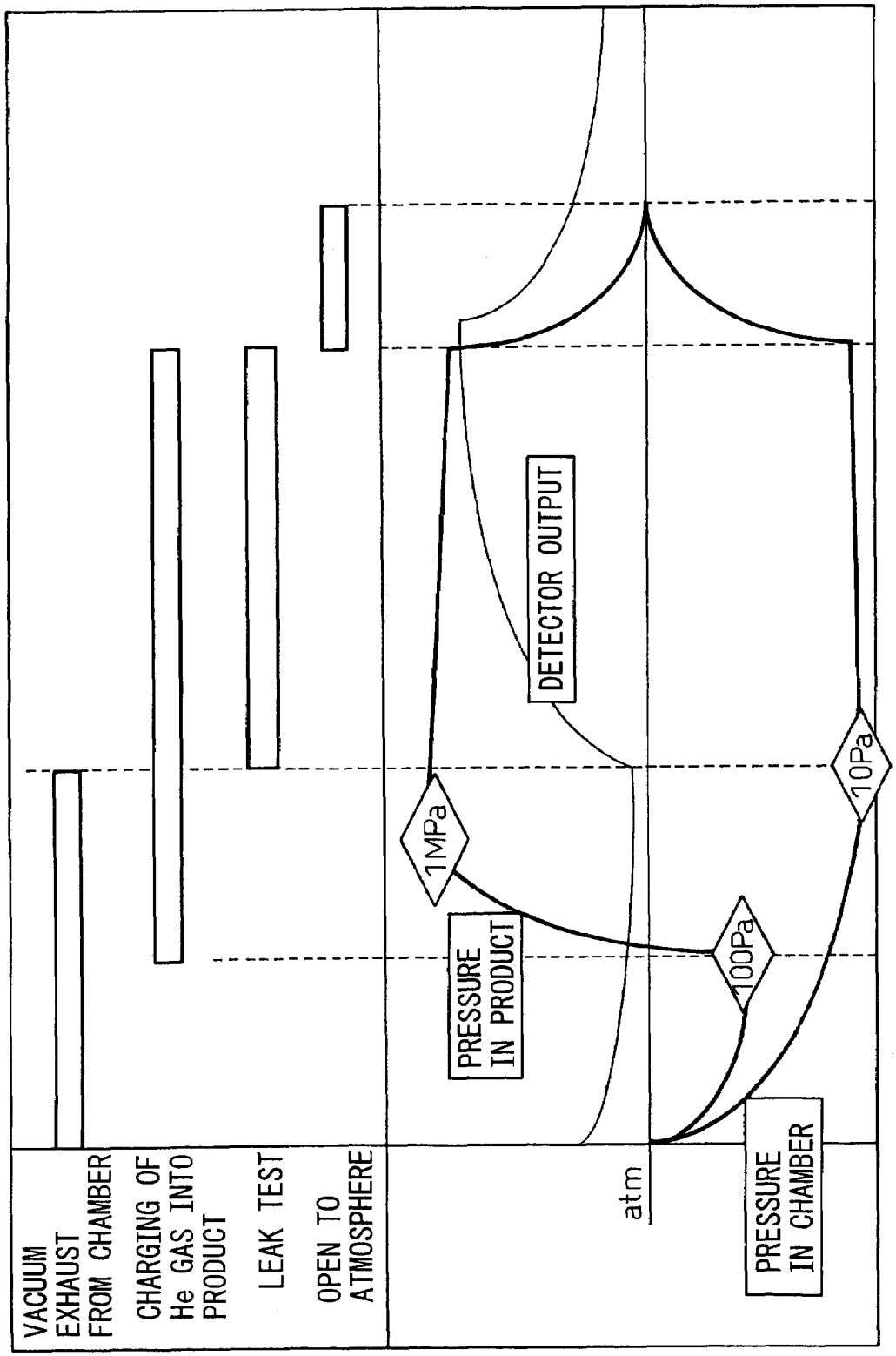

LEAK INSPECTION DEVICE

BACKGROUND OF THE INVENTION

1. Field of the Invention

The present invention relates to a leak inspection device in which air leakage from an object to be inspected is detected with a leakage inspection medium (tracer gas) such as helium gas (He gas).

2. Description of the Related Art

Concerning prior art inspection methods to inspect a minute gas leak in an object to be inspected, an inspection method has been provided in which a helium gas leak detector, to detect helium gas which has leaked out from an object to be detected, is used. An example of this inspection method is a vacuum type helium gas leak inspection method in which the gas leak inspection device shown in FIG. 6 is used.

In the vacuum type leak inspection device shown in FIG. 6, an inspection is conducted according to the inspection flow shown in FIG. 8, which will be described as follows. A product 1, which is an object to be inspected, is accommodated in a vacuum chamber 2, and a pipe for charging He gas is connected to the product 1. Next, a vacuum pump 3 is operated so as to discharge air from the vacuum chamber 2. When the degree of vacuum in the vacuum chamber 2 has reached a predetermined value, for example, when the degree of vacuum in the vacuum chamber 2 has reached 10 Pa, the vacuum pump 3 is stopped so as to stop an air discharging operation and the product 1 is filled with He gas supplied from He bomb (gas cylinder) 4. At this time, He gas is supplied until the pressure of He gas in the product 1 is raised to 1 MPa. Next, He gas, which has leaked out from the product 1, is introduced into a leak detector 5 and a volume of the leakage gas is measured by utilizing a mass spectrometry method. According to the result of the measurement, the quality of the product 1 is judged.

However, there are various sizes of products to be inspected. Therefore, as shown in FIG. 7B, it is necessary to determine a size of the vacuum chamber so that a product of the maximum size can be accommodated in it. Accordingly, in the case where a small product is tested as shown in FIG. 7A, the unused space is inevitably large as compared with the size of the product. Accordingly, it is necessary to discharge a large volume of air. As a result, it is necessary to provide a large capacity air discharge pump to discharge air from the vacuum chamber. Further, it takes a long time to discharge the air from the vacuum chamber.

Also, when the volume of the vacuum chamber is large, the concentration of the He gas which has leaked out from the product is low in the vacuum chamber. Accordingly, the measurement sensitivity is deteriorated.

SUMMARY OF THE INVENTION

The present invention has been accomplished to solve the above problems. A first object of the present invention is to provide a leak inspection device characterized in that a volume of redundant air to be discharged from the vacuum chamber is decreased so that the capacity of the vacuum pump can be reduced and the discharging time can be also reduced.

A second object of the present invention is to provide a leak inspection device characterized in that, when the space in the vacuum chamber is made smaller, dilution of the He gas which has leaked out from the product can be prevented so that the measuring sensitivity can be enhanced.

The present invention provides a leak inspection device comprising: a vacuum chamber 2 for accommodating an object 1 to be inspected; a vacuum pump 3 for discharging air from the vacuum chamber 2; a tracer gas supply source 4 for supplying and charging tracer gas into the object 1 to be inspected; and a leak detector 5 for detecting tracer gas which has leaked out from the object 1 to be detected, wherein the tracer gas is pressurized and charged into the object 1 to be inspected, which is accommodated in the vacuum chamber 2, so as to detect leakage of the tracer gas from the object 1 to be inspected, the gas leak inspection device further comprising a displacement change means (8, 8A to 8G, 9) for changing the volume of the vacuum chamber 2. Due to the foregoing, it is possible to reduce the volume of the exhaust gas discharged from the vacuum chamber 2 and it is also possible to decrease the capacity of the vacuum pump 3. As it is possible to reduce the size of the vacuum chamber 2, dilution of the He gas which has leaked out from the object to be inspected can be prevented. Accordingly, the measuring sensitivity can be enhanced.

In a leak inspection device of the present invention, the displacement change means is a variable displacement piston 8 which moves a wall face of the vacuum chamber. Due to the above constitution, when the variable displacement piston 8 is held at an appropriate position, it is possible to obtain a vacuum chamber 2, the volume of which the accords to the size of the object 1 to be inspected.

In a leak inspection device of the present invention, a plurality of variable displacement pistons 8A to 8G are provided. Due to the above constitution, even in the case of complicated object 1 to be inspected, the variable displacement pistons 8A to 8G are stopped at various positions so that the pistons 8A to 8G accord with the shape of the object 1 to be inspected and the redundant space in the vacuum chamber 2 can be reduced.

In a leak inspection device of the present invention, the vacuum chamber 2 is cylindrical. Due to the above constitution, when a shape of the vacuum chamber is made to agree with the shape of the object 1 to be inspected, it becomes possible to further eliminate redundant space from the vacuum chamber 2.

In a leak inspection device of the present invention, the displacement change means is an elastic bulkhead 9, which can be freely expanded and contracted, for partitioning the vacuum chamber into two chambers 2a, 2b. Due to the above constitution, it is possible to change a volume of the chamber 2a, in which the object 1 to be inspected is accommodated, by a difference in pressure between the chamber 2a in which the object to be inspected is accommodated and the chamber 2b in which the object to be inspected is not accommodated. Therefore, the leak inspection device of the present invention can be applied to an object 1 to be inspected whatever the shape of the object 1 may be.

The present invention may be more fully understood from the description of preferred embodiments of the invention, as set forth below, together with the accompanying drawings.

BRIEF DESCRIPTION OF THE DRAWINGS

In the drawings:

FIG. 1 is an overall arrangement view of a leak inspection device of an embodiment of the present invention, wherein the leak inspection device includes a variable displacement means of the first embodiment;

FIG. 8 is a view for explaining an inspection procedure of the leak inspection device.

DESCRIPTION OF THE PREFERRED EMBODIMENT

Figure 2A:
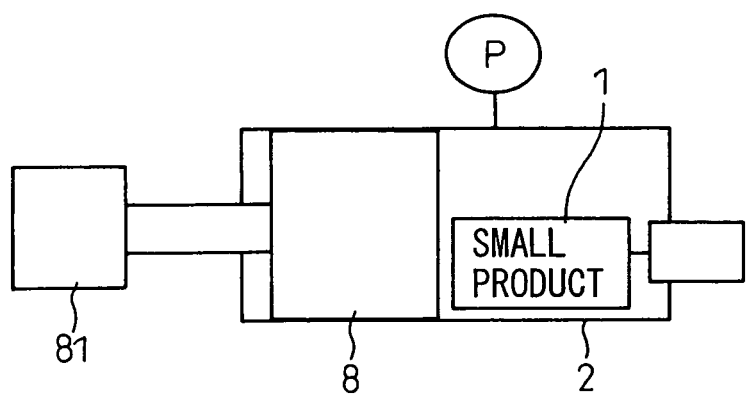
FIG. 2A is a schematic illustration for explaining a state of operation of the variable displacement means in the case of a small product.

Referring to the drawings, a leak inspection device of an embodiment of the present invention will be explained below. FIG. 1 is an overall arrangement view of the leak inspection device of the embodiment of the present invention. The leak inspection device basically includes: a vacuum chamber 2 for accommodating a product 1 which is an object to be inspected; a vacuum pump 3 for discharging air from the vacuum chamber 2; a helium bomb (gas cylinder) (He bomb) 4, which is a tracer gas supply source, for supplying tracer gas such as helium gas (He gas) into the product 1; and a leak detector 5 for detecting He gas which has leaked out from the product 1.

The vacuum chamber 2 has a capacity in which the product 1, the size of which is variously changed, can be accommodated. Further, the vacuum chamber 2 includes a displacement changing means by which a volume in the vacuum chamber 2 can be changed. This displacement changing means will be described in detail later. The vacuum chamber 2 is mainly connected to three piping systems 10, 20, 30.

The first piping system 10 is a piping system for supplying He gas into the product 1 and for discharging He gas from the product 1 to the outside. That is, the first piping system includes: He gas supply system in which He gas flows from He bomb (cylinder) 4 to the first valve 11 and enters the manifold 14 and is supplied to the product 1; a first discharge piping system which branches from the manifold 14 so that He gas can flow through the second valve 12 into the atmosphere; and a second discharge piping system which branches from the manifold 14 and connects with the discharging pump 6 through the third valve 13 so as to forcibly discharge He gas from the product 1. In this connection, a pressure sensor 15 is provided at an outlet of He bomb 4. Pressure gauges P for monitoring the inner pressure are respectively arranged in the He supply piping system, the manifold 14 and the vacuum chamber 2.

The second piping system 20 is a piping system for discharging air from the vacuum chamber 2 to the outside. Air flows from the vacuum chamber 2 through the fourth valve 21 and is forcibly discharged outside by the vacuum pump 3. In the vacuum chamber 2, the eighth valve 40 is provided, through which air is introduced into the vacuum chamber 2 after the completion of a leakage inspection so as to fill the vacuum.

The third piping system 30 is an inspection piping system for inspecting He gas which has leaked out from the product 1 into the vacuum chamber 2. He gas, which has leaked out from the product 1, flows in the fifth valve 31 and the sixth valve 32 and is introduced in the leak detector 5. In the leak detector 5, a volume of He gas, which has leaked out, is measured. The third piping system 30 includes a sweep piping system for sweeping He gas when the piping system branches from between the fifth and the sixth valve 31, 32 and connects to the sweeping pump 7 through the seventh valve. This sweep piping system sweeps He gas which attaches to, or stays in, the third piping system 30.

In this connection, in FIG. 1, the fourth to the eighth valve 21, 31 to 33, 40 are respectively illustrated as an air cylinder operation type valve. However, it is also possible to employ an electromagnetic type valve.

Figure 7A:
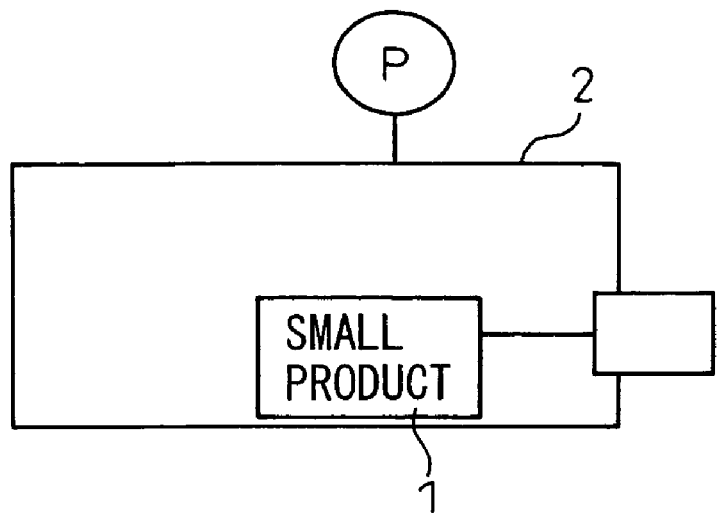
FIG. 7A is a view for explaining a state of inspection of a small product in which the conventional leak inspection device is used.
Figure 7B:
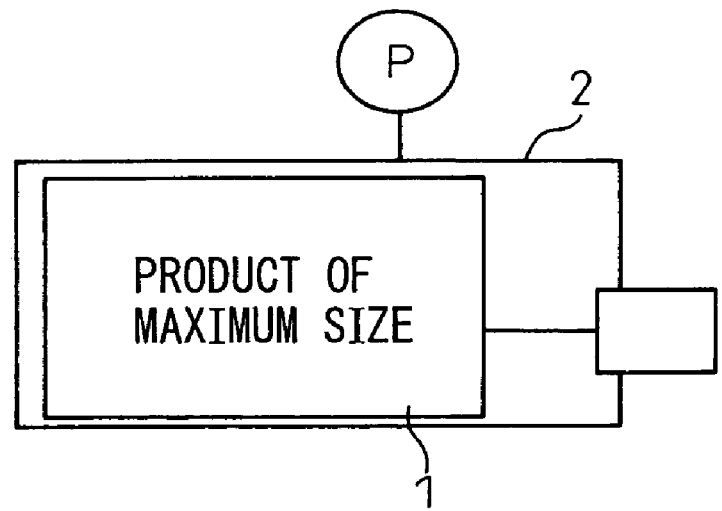
FIG. 7B is a view for explaining a state of inspection of a large product in which the conventional leak inspection device is used.

Next, explanations will be made into a displacement change means which is a characteristic of the present embodiment. As explained above, according to the prior art, a volume of the vacuum chamber 2 is determined according to the product 1 of the maximum size to be subjected to a leakage inspection. Therefore, the following problems may be encountered in the case where a small product 1 is inspected. In the case where the small product 1 is inspected as shown in FIG. 7A, a redundant space is not useful in the vacuum chamber 2. Corresponding to this redundant space, it takes time and expense to discharge the air in the vacuum chamber 2. Further, due to the existence of this redundant space, the measuring sensitivity of measuring a leakage is lowered. Therefore, in order to reduce the amount of redundant space in the vacuum chamber 2 to as little as possible, a variable displacement means for changing the volume of the vacuum chamber 2 is provided in the present embodiment.

Figure 2B:
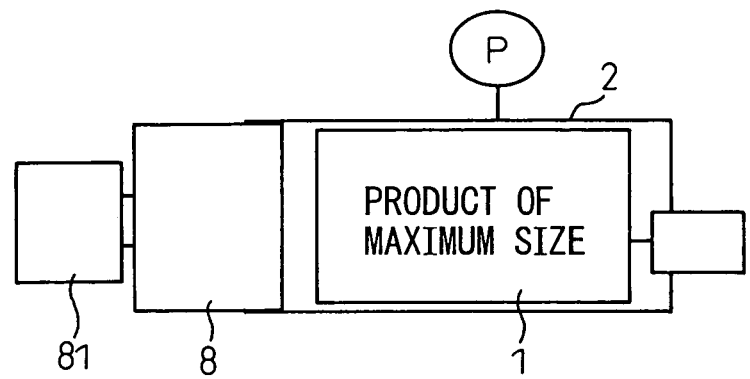
FIG. 2B is a schematic illustration for explaining a state of operation of the variable displacement means in the case of a large product.

In the first embodiment of the first variable displacement means shown in FIGS. 2A and 2B, a variable displacement piston 8, which is arranged in the vacuum chamber 2 and moves along wall faces of the vacuum chamber 2, is provided as a variable displacement means. A cross-sectional area of the variable displacement piston 8 is substantially the same as the area of the side of the vacuum chamber 2. It is preferable that the side of the vacuum chamber 2, on which the variable displacement piston 8 is arranged, is a wall face opposed to the wall face onto which the first piping system 10, which is a supply and discharge system of He gas of the vacuum chamber 2, is connected. The variable displacement piston 8 conducts a straight reciprocating motion in the lateral direction in FIG. 1 by a piston drive device 81. The piston drive device 81 may be a well known straight reciprocating mechanism, for example, the piston drive device 81 may be a hydraulic cylinder unit, a rack and pinion mechanism or a ball and screw mechanism.

Operation of the leak inspection device, of the present embodiment and composed as described above, will be explained below. First of all, to a position in the vacuum chamber 2, which has been previously determined according to the size of the product 1 of the object 1 to be inspected, the variable displacement piston 8 is moved by the piston drive device 81. After that, the product 1 is set into the vacuum chamber 2 and then the first piping system 10 is connected to the product 1. Next, the fourth valve 21 of the second piping system 20.is opened and the vacuum pump 3 is driven so as to discharge air from the vacuum chamber 2. In this connection, the fifth, sixth and seventh valves 31, 32, 33 in the third piping system 30 are closed. Further, the eighth valve 40 for breaking a vacuum is also closed. Substantially simultaneously, when air is discharged from the vacuum chamber 2, the third valve 13 in the first piping system 10 is opened and the exhaust pump 6 is driven, so that air can be discharged from the product 1. At this time, of course, the first and second valves 11, 12 are closed.

After air has been discharged from the vacuum chamber 2 and pressure in the vacuum chamber 2 is approximately reduced to 10 Pa, that is, after the vacuum chamber 2 has been put substantially into a vacuum state, operation of the vacuum pump 3 is stopped and the fourth valve 21 is closed at the same time. In the same manner, after air has been discharged from the product 1, operation of the exhaust pump 6 is stopped and the third valve 13 is closed.

Next, the first valve 11 in the first piping system 10 is opened and He gas is supplied from He bomb 4 into the product 1. After pressure in the product 1 has been substantially raised to 1 MPa, the first valve 11 is closed and the supply of He gas from He bomb 4 is stopped. At this time, of course, the second and third valves 12, 13 are closed. In this way, He gas, the pressure of which is approximately 1 MPa, is charged into the product 1.

After that, the fifth and sixth valves 31, 32 in the third piping system 30 are opened and the seventh valve 33 is closed. In this way, He gas, which has leaked out from the product 1 into the vacuum chamber 2, is introduced into the leak detector 5. In the leak detector 5, by utilizing a mass spectrometry method for detecting helium, a volume of He gas, which has leaked out from the product 1 into the vacuum chamber 2, is measured. By the volume of He gas which has leaked out from the product 1 into the vacuum chamber 2 in a predetermined period of time, the quality of the product 1 is judged.

After the completion of the leakage inspection, the seventh valve 33 of the third piping system 30 is opened and the sweeping pump 7 is operated, so that He gas, which attaches to or stays in the third piping system 30, the leak detector 5 and the fifth, sixth and seventh valves 31, 32, 33, can be removed. Therefore, these components can be cleaned. At the same time, the eighth valve 40 is also opened and air is introduced into the vacuum chamber 2 so as to break the vacuum.

Further, the second valve 12 in the first piping system 10 is opened while the first and third valves 11, 13 are closed. In this way, He gas is released from the product 1 into the atmosphere. Finally, the product 1, the inspection of which has been completed, is disconnected from the first piping system 10 and taken out of the vacuum chamber 2.

FIGS. 2A and 2B are views for explaining a state in which the volume of the vacuum chamber is changed according to the product size. That is, in the case of the product 1 of a small size, as shown in FIG. 2A, when the variable displacement piston 8 is moved so as to make a forward end portion of the variable displacement piston 8 move into the vacuum chamber 2, the volume of the vacuum chamber 2 can be reduced, that is, a redundant space can be eliminated from the vacuum chamber 2. Accordingly, air can be discharged from the vacuum chamber 2 with a vacuum pump 3 of a small capacity.

In the case of the product 1 of a large size, as shown in FIG. 2B, when a forward end portion of the variable displacement piston 8 is retreated to a position close to the wall face of the side of the vacuum chamber 2 by moving the variable displacement piston 8, it is possible to increase the volume in the vacuum chamber 2 so that the large product 1 can be accommodated in the vacuum chamber 2. Even in this case, a redundant space is not generated in the vacuum chamber 2 so that air can be discharged from the vacuum chamber 2 by a vacuum pump 3 of a small capacity.

Figure 3:
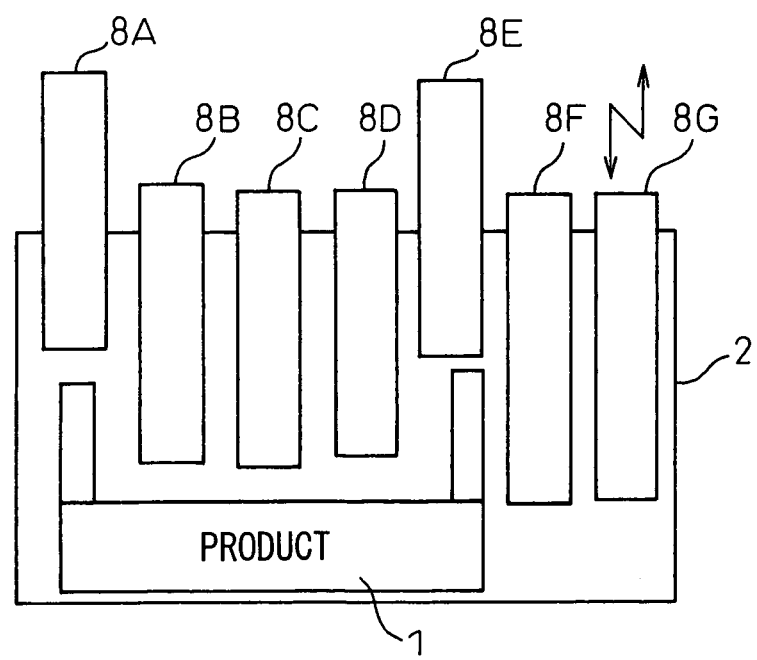
FIG. 3 is a view showing the second embodiment of the variable displacement means.

FIG. 3 is a view showing the second embodiment of the variable displacement means. In the first embodiment, the variable displacement means includes one variable displacement piston 8. However, in the second embodiment, the variable displacement means includes a plurality of variable displacement pistons 8A to 8G. In this case, the piston drive unit is not shown in the drawing. The variable displacement pistons 8A to 8G are composed so that the pistons can be individually and independently moved. The reason why the variable displacement pistons 8A to 8G are composed as described above is as follows. Even in the case of a product 1, the shape of which is complicated, a redundant space is not generated in the vacuum chamber 2 according to the constitution described above. That is, in FIG. 3, corresponding to the shape of the product 1 arranged in the vacuum chamber 2, the variable displacement pistons 8F, 8G are respectively pushed deep into the vacuum chamber 2. Next, the variable displacement pistons 8B, 8C, 8D are respectively pushed into an intermediate position. The variable displacement pistons 8A, 8E are respectively pushed only a little. In this way, a redundant space generated in the vacuum chamber 2 can be reduced as much as possible. In this connection, in FIG. 3, all of the plurality of variable displacement pistons 8a to 8G are arranged on the wall face on the same side of the vacuum chamber 2. However, the variable displacement pistons 8a to 8G may be separately arranged on a wall face on another side.

Figure 4:
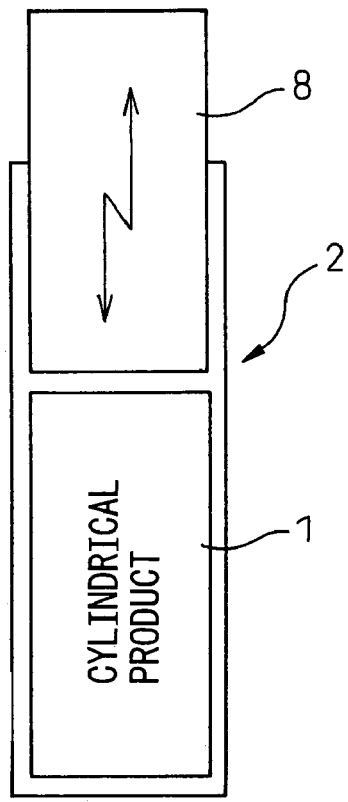
FIG. 4 is a view showing the third embodiment of the variable displacement means.

FIG. 4 is a view showing the third embodiment of the variable displacement means. In this third embodiment of the variable displacement means, the vacuum chamber 2 is formed into a cylindrical shape and arranged vertically. Accordingly, corresponding to the shape of this vacuum chamber 2, the variable displacement piston 8 is also formed into a cylindrical shape. The variable displacement piston 8 is arranged in such a manner that the variable displacement piston 8 penetrates an upper wall face of the vacuum chamber 2 and is capable of moving in the vertical direction. This embodiment is preferably applied to a case in which a shape of the product 1 is circular.

Figure 5:
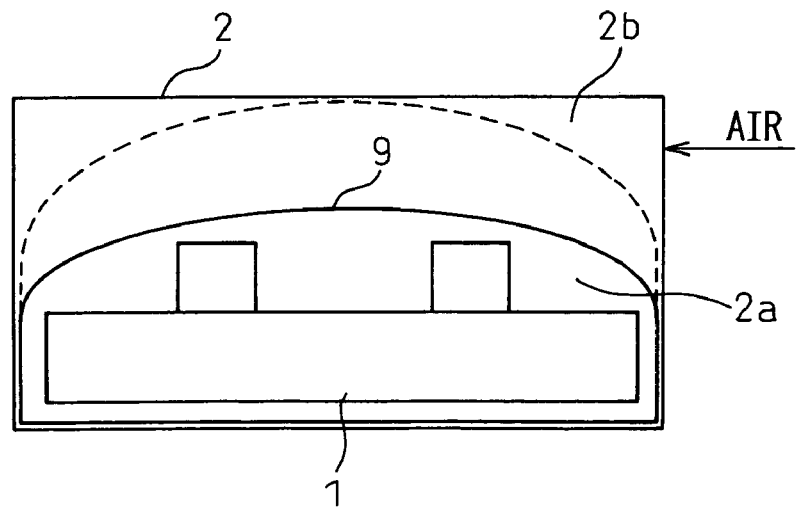
FIG. 5 is a view showing the fourth embodiment of the variable displacement means.
Figure 6:
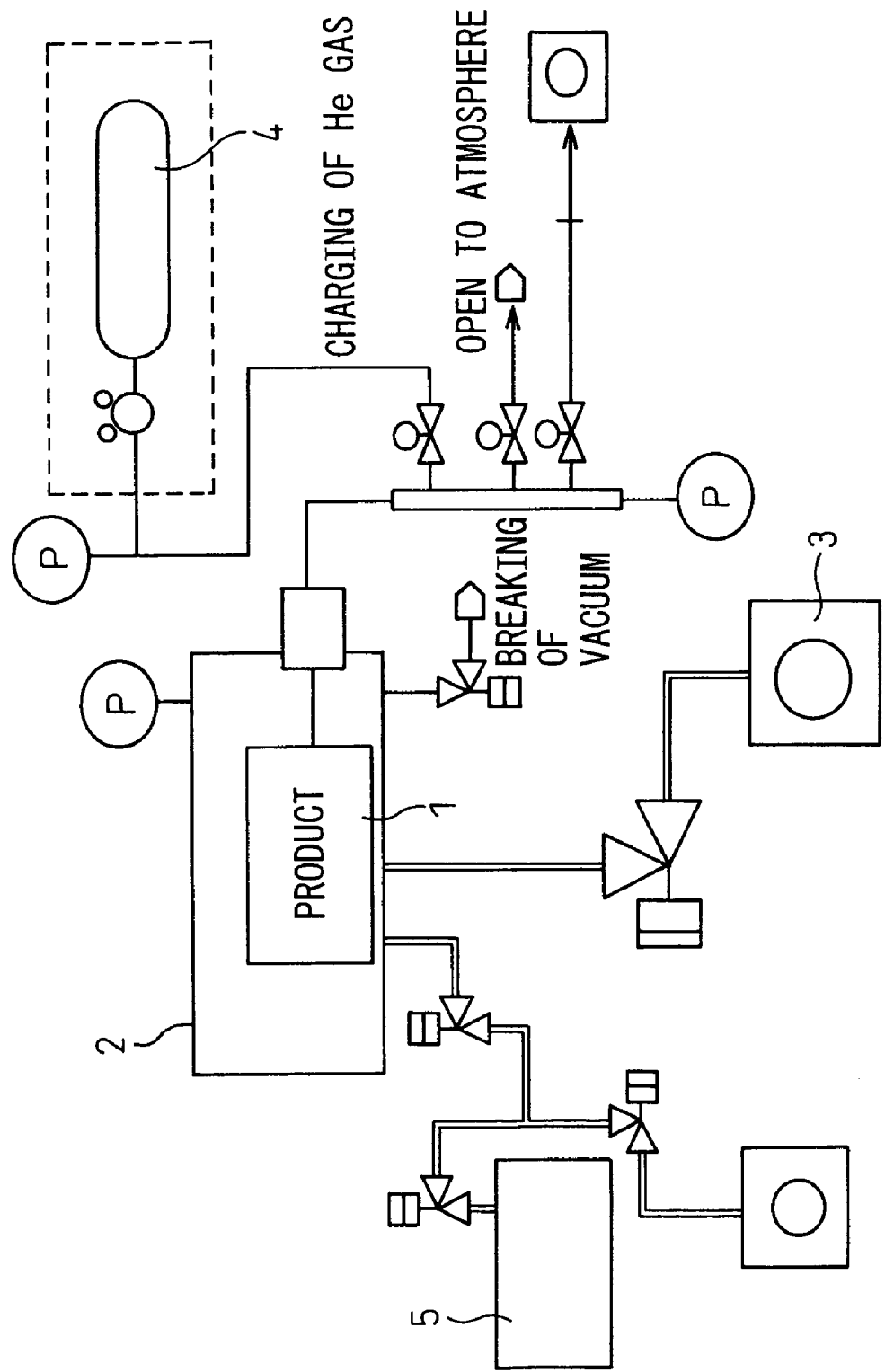
FIG. 6 is an overall arrangement view of a conventional leak inspection device.

FIG. 5 is a view showing the fourth embodiment of the variable displacement means. In the first to the third embodiment, the variable displacement pistons 8, 8A to 8G are employed as a variable displacement means. However, in the fourth embodiment, an elastic bulkhead 9, which can be freely expanded and contracted, is employed as a variable displacement means. That is, the elastic bulkhead 9, which can be freely expanded and contracted, is arranged in the vacuum chamber 2, and the vacuum chamber 2 is divided into a product chamber 2a, in which the product 1 is accommodated, and an air chamber 2b in which the product 1 is not accommodated. Accordingly, when a product is accommodated in the product chamber 2a of the vacuum chamber 2 and then air is sucked from the product chamber 2a with the vacuum pump 3, by introducing air onto the air chamber 2b side, it is possible to support a discharging action of air from the product chamber 2a with a pressure difference between the two chambers. Accordingly, it becomes possible to reduce a capacity of the vacuum pump 3. Further, it becomes possible to shorten an air discharging time. Even when it is set in such a manner that a volume on the product chamber 2a side is increased and a volume on the air chamber 2b side is decreased, as the elastic bulkhead 9 can be freely expanded and contracted, a volume ratio can be freely changed by the pressure difference between both chambers 2a and 2b.

As explained above, according to the present invention, the volume of the vacuum chamber can be changed corresponding to a product size. Therefore, the volume of redundant air to be discharged from the vacuum chamber can be reduced. As a result, the capacity of the vacuum pump can be reduced and, further, an air discharging time can be shortened. As a redundant space in the vacuum chamber can be reduced, He gas, which has leaked out from a product, can be prevented from being diluted. Accordingly, the measuring sensitivity can be enhanced.

While the invention has been described by reference to specific embodiments chosen for purpose of illustration, it should be apparent that numerous modifications could be made thereto by those skilled in the art without departing from the basic concept and scope of the invention.

The invention claimed is:

1. A leak inspection device comprising:
a vacuum chamber for accommodating an object to be inspected;
a vacuum pump for discharging air from the vacuum chamber;
a tracer gas supply source for supplying and charging tracer gas into the object to be inspected;
a leak detector for detecting tracer gas which has leaked out from the object to be detected
displacement means for changing a volume of the vacuum chamber; wherein
the tracer gas is pressurized and charged into the object to be inspected, which is accommodated in the vacuum chamber, so as to inspect a leakage of the tracer gas from the object to be inspected; and
the displacement change means is a plurality of variable displacement pistons which are arranged in the vacuum chamber and move along a wall face of the vacuum chamber.

2. A leak inspection device according to claim 1, wherein the vacuum chamber is cylindrical.

3. A leak inspection device comprising:
a vacuum chamber having a variable volume;
an object to be inspected disposed within the vacuum chamber;
means for changing the variable volume of the vacuum chamber;
a vacuum pump discharging air from a portion of the vacuum chamber surrounding an exterior surface of the object;
a tracer gas supply source providing pressurized gas into the object to be inspected; and
a leak detector detecting tracer gas which has leaked out from the object to be detected.

4. A leak inspection device according to claim 3, wherein the changing means is a variable displacement piston disposed in the vacuum chamber.

5. A leak inspection device according to claim 3, wherein the changing means is a plurality of variable displacement pistons disposed in the vacuum chamber.

6. A leak inspection device according to claim 3, wherein the vacuum chamber is cylindrical.

7. A leak inspection device according to claim 3, wherein the changing means is an elastic bulkhead.

* * * * *